United States Patent
Costa et al.

(10) Patent No.: US 9,501,213 B2
(45) Date of Patent: Nov. 22, 2016

(54) SCHEDULING EVENTS ON AN ELECTRONIC CALENDAR UTILIZING FIXED-POSITIONED EVENTS AND A DRAGGABLE CALENDAR GRID

(71) Applicants: Ciprian Costa, Reghin (RO); Daniel Klausmeier, Monte Sereno, CA (US)

(72) Inventors: Ciprian Costa, Reghin (RO); Daniel Klausmeier, Monte Sereno, CA (US)

(73) Assignee: Skadool, Inc., Monte Sereno, CA (US)

( * ) Notice: Subject to any disclaimer, the term of this patent is extended or adjusted under 35 U.S.C. 154(b) by 561 days.

(21) Appl. No.: 13/621,839

(22) Filed: Sep. 17, 2012

(65) Prior Publication Data

US 2014/0082536 A1    Mar. 20, 2014
US 2016/0231912 A9    Aug. 11, 2016

Related U.S. Application Data

(60) Provisional application No. 61/535,784, filed on Sep. 16, 2011.

(51) Int. Cl.
  *G06F 3/0484*  (2013.01)
  *G06F 3/0488*  (2013.01)
  *G06F 3/0481*  (2013.01)
  *G06F 3/0486*  (2013.01)
  *G06Q 10/10*   (2012.01)

(52) U.S. Cl.
  CPC ......... *G06F 3/04847* (2013.01); *G06F 3/0481* (2013.01); *G06F 3/0486* (2013.01); *G06F 3/0488* (2013.01); *G06Q 10/1093* (2013.01); *G06F 2203/04806* (2013.01)

(58) Field of Classification Search
  CPC ............... G06F 9/4443; G06F 3/0481; G06F 3/04847; G06F 3/0486; G06F 3/0488; G06F 2203/04806; G09G 5/14; H04N 5/44591; G06Q 10/1093; G06Q 10/109
  USPC .......................... 715/711, 799, 802, 851, 732
  See application file for complete search history.

(56) References Cited

U.S. PATENT DOCUMENTS

| | | | | |
|---|---|---|---|---|
| 5,760,773 | A  * | 6/1998 | Berman et al. | 715/808 |
| 5,874,965 | A  * | 2/1999 | Takai et al. | 345/667 |
| 5,936,625 | A  * | 8/1999 | Kahl et al. | 715/775 |
| 6,486,896 | B1 * | 11/2002 | Ubillos | 715/784 |
| 7,178,111 | B2 * | 2/2007 | Glein et al. | 715/848 |
| 7,487,458 | B2 * | 2/2009 | Jalon et al. | 715/765 |
| 7,788,598 | B2 * | 8/2010 | Bansal et al. | 715/810 |
| 8,392,848 | B2 * | 3/2013 | Gould | 715/801 |
| 8,878,799 | B2 * | 11/2014 | Lee et al. | 345/173 |
| 2002/0063737 | A1 * | 5/2002 | Feig et al. | 345/786 |
| 2002/0154173 | A1 * | 10/2002 | Etgen et al. | 345/833 |

(Continued)

*Primary Examiner* — Jennifer To
*Assistant Examiner* — John Repsher, III
(74) *Attorney, Agent, or Firm* — Lewis Roca Rothgerber Christie LLP

(57) ABSTRACT

A method for scheduling an event in a calendar application is disclosed wherein the event is held at a fixed position on the screen of a device and a calendar grid is dragged relative to the event. The method is well-suited for touch devices and provides a way for the user to easily create and schedule events directly on a calendar grid without the need to enter event start and end times into a form. A view finder assists the user to set the desired start and end time. The view finder supports different zoom precisions which allow the user to enter start and end times of any granularity such as one minute granularity. A micro-dragging technique provides a way to easily select start and end times with high precision. The method may be extended to general applications where it is desirable to drag objects on a workspace.

29 Claims, 9 Drawing Sheets

(56) References Cited

U.S. PATENT DOCUMENTS

| | | | |
|---|---|---|---|
| 2008/0015922 A1* | 1/2008 | Nelken | 705/8 |
| 2008/0141145 A1* | 6/2008 | Klausmeier | 715/751 |
| 2009/0164906 A1* | 6/2009 | Stallings et al. | 715/730 |
| 2009/0174680 A1* | 7/2009 | Anzures et al. | 345/173 |
| 2009/0254370 A1* | 10/2009 | Kondo et al. | 705/3 |
| 2009/0282361 A1* | 11/2009 | Cortright | 715/786 |
| 2009/0282362 A1* | 11/2009 | Matsumoto | 715/787 |
| 2010/0099462 A1* | 4/2010 | Baek et al. | 455/566 |
| 2010/0115441 A1* | 5/2010 | Lee | 715/769 |
| 2010/0157742 A1* | 6/2010 | Relyea et al. | 368/28 |
| 2010/0175001 A1* | 7/2010 | Lazarus | G06Q 10/109 715/753 |
| 2010/0175028 A1* | 7/2010 | Nozaki | 715/830 |
| 2011/0078622 A1* | 3/2011 | Missig et al. | 715/784 |
| 2011/0126097 A1* | 5/2011 | Isono | 715/702 |
| 2011/0167382 A1* | 7/2011 | van Os | 715/800 |
| 2011/0239146 A1* | 9/2011 | Dutta et al. | 715/768 |

\* cited by examiner

SCHEDULING EVENTS ON AN ELECTRONIC CALENDAR UTILIZING FIXED-POSITIONED EVENTS AND A DRAGGABLE CALENDAR GRID

CROSS-REFERENCE TO RELATED APPLICATIONS

This application claims the priority benefit of U.S. Provisional Application Ser. No. 61/535,784, titled "Scheduling Events on an Electronic Calendar Utilizing Fixed-positioned Events and a Draggable Calendar Grid," filed Sep. 16, 2011, the disclosure of which is incorporated herein by reference.

BACKGROUND OF THE INVENTION

Field of the Invention

The present invention relates to scheduling events on a calendar workspace, and more specifically to scheduling events on a calendar workspace of a touch screen device such as a smart phone. The invention may be generally applied to relocating objects or features of objects on a draggable workspace.

Description of Related Art

The electronic calendar is a common computer application. This application will typically offer the user multiple ways to view a calendar of events along with methods to assist with scheduling events. For instance, a month view will typically show the events for all the days in a month and allow the user to navigate between months. Users typically can create events on specific dates often by double clicking on those dates. This will open a form that allows the user to enter details about the event such as the scheduled time. Typically, users can also drag existing events between dates in month view to move them to other dates.

Another view is a list view where events are organized chronologically in a list. Typically separators are inserted that identify the date for each group of events that share the same date. List view offers minimal assistance with scheduling but is the most space efficient way for displaying a large number of events. This makes it a popular view on small screen devices such as smart phones.

Week view is another view that is typically offered by related art calendar applications. This view will show a column for every day of the week and rows for different times of the day. Labels above the columns identify the date and day of week for that column. These labels can be thought of as coordinates on the date axis of a calendar grid. The time-of-day is arranged vertically with the start of the day at the top of the columns and the end of the day at the bottom of the columns. Labels on the left side of the view identify the time-of-day corresponding to a horizontal line that is drawn across the columns. These labels can be thought of as coordinates on the time-of-day axis of the calendar grid. Events occupy a column corresponding to their scheduled date and a vertical region of the column corresponding to their start and end time. Typically, the entire 24 hours of a day does not fit in the vertical space allotted to the application's view window. In these cases a scrolling mechanism is used to allow the user to scroll through the entire day.

Week view is a popular view for finding a free time for a new event as the user can scroll to a period of day of interest, such as lunch time, and view this period across all the days of a week to identify a free or open time slot for a desired appointment.

The week view is one of a general set of n-day views where n can be any number of day columns, typically up to seven. On portable devices such as smart phones, the 1-day view is popular due to the limited screen space for displaying multiple columns.

The n-day views of related art calendar applications typically allow the user to create and reschedule events directly on the calendar grid. On computing devices that are aided by a mouse or mouse pad (i.e., mouse-assisted computers), dragging over the grid of an n-day view is typically supported as a method for creating an event for the corresponding time. Users can also drag existing events on these workspaces to reschedule them. This is a simple yet powerful feature because the user can utilize the same graphical user interface that identifies a free time when scheduling an event. This is even more powerful when the calendar application allows the user to overlay the events and/or busy time of other participants of the event. This capability is common across many calendar applications.

There are some limitations with this n-day view drag feature on related art calendar applications. One limitation is that a time granularity is enforced that causes the scheduled time of the event to snap to the granularity of the workspace when the user drags on the workspace. Typically, this time granularity is set to 30 minutes. This is done as an aid to the user since many events are scheduled on half hour boundaries. However, for events with start and/or end times that do not fall on these 30 minute boundaries, the user must exit the calendar view to access a form where they can enter the desired time directly without the aid of their calendar view. In some applications the user can configure the granularity of their views to achieve a smaller granularity. However, smaller granularities effectively act as a "zoom-in" feature that increase the vertical space allotted to an hour of time. This results in fewer hours fitting within the view window of the application. Consequently, the utility of the view is diminished.

Another limitation with the drag feature when rescheduling on an n-day view is that the existing scheduled time for an event may not be in the same view window as the desired scheduled time. Therefore, dragging the existing event to the desired time is not always possible. Sometimes, a vertical auto-scroll feature will cause the workspace to automatically scroll up or down when the user drags an event across the view window's boundary. This can be an awkward feature and is not well suited for browsing a calendar to find a suitable time because the system often makes wrong assumptions about how fast the user wants to scroll. It can often scroll too far before the user gets a chance to stop the auto-scroll. For some systems, the auto-scroll feature makes it difficult to return the event back to the original time. Horizontal auto-scroll to find alternative dates is typically not offered for these reasons.

On touch screen devices, such as a smart phone or tablet computer, the drag capability of a device is typically accomplished by touching the device screen with one's finger and dragging it across the display. This drag operation, however, will usually invoke the scroll capability of the device. For instance in a 1-day or 7-day view of a calendar application on a touch screen device, dragging one's finger up or down scrolls the entire view to allow the user to access all the hours of the corresponding days. As a result, it is not possible to drag on the calendar workspace to create or reschedule an event. These operations are instead delegated to an electronic form where the user enters the start and/or end time of an event without having the assistance of the calendar workspace to find a free time for the event.

These limitations of related art calendar applications result in several cases where the user must exit the calendar view and go to an editor form to enter the desired date and time of an event.

SUMMARY OF THE INVENTION

The present invention relates to scheduling events directly on a calendar grid by utilizing a drag capability of a device. The invention may be used on any computing device known in the art such as touch screen devices and mouse assisted computers. It further allows the start and end times of an event to be scheduled with any granularity without sacrificing the number of hours displayed on the calendar grid. The invention also allows a user to easily reschedule existing events to other dates and times that are outside the view window of the application without the need to exit the calendar grid to enter new or updated data in a form.

In one embodiment of the invention, the user may choose to edit the start time or end time of an event in a one-day calendar view. A semi-transparent shaded area covers the area of the calendar grid that corresponds to the scheduled time of the event. When editing the start time, this semi-transparent area stays at a fixed position as the user scrolls the calendar grid up or down. Rather than drag the event to the desired time as is done in related art calendar applications, the user effectively drags the desired time to the event.

When editing the end time, only the bottom of the semi-transparent area is placed at a fixed location. If the user drags the calendar grid up or down, the top of the semi-transparent area will follow the start time of the event in the corresponding direction. Visually, the semi-transparent area will stretch or shrink as the user scrolls reflecting the change to the event's duration.

In another embodiment, a virtual view finder is placed over a time-of-day column at the position of the start time or end time being edited. While scrolling, the user can see in the view finder what the new start or end time would be. The view finder may have different zoom precisions that correspond to different scheduling granularities. For instance, the user may select zoom precisions of 30 minutes, 5 minutes, or 1 minute. The selected zoom precision of the view finder does not affect the display resolution of the workspace. Instead, the scroll speed is adjusted based on the selected precision so that the user can easily drag the desired time into the view finder without reducing the amount of time that is displayed in the workspace.

The invention may generally be applied to other applications where it is desired to move features of objects across a workspace. For example, a drawing application could utilize the methods of the present invention to move an object on a workspace and to edit the size of an object.

DETAILED SUMMARY OF THE INVENTION

Figure 1:
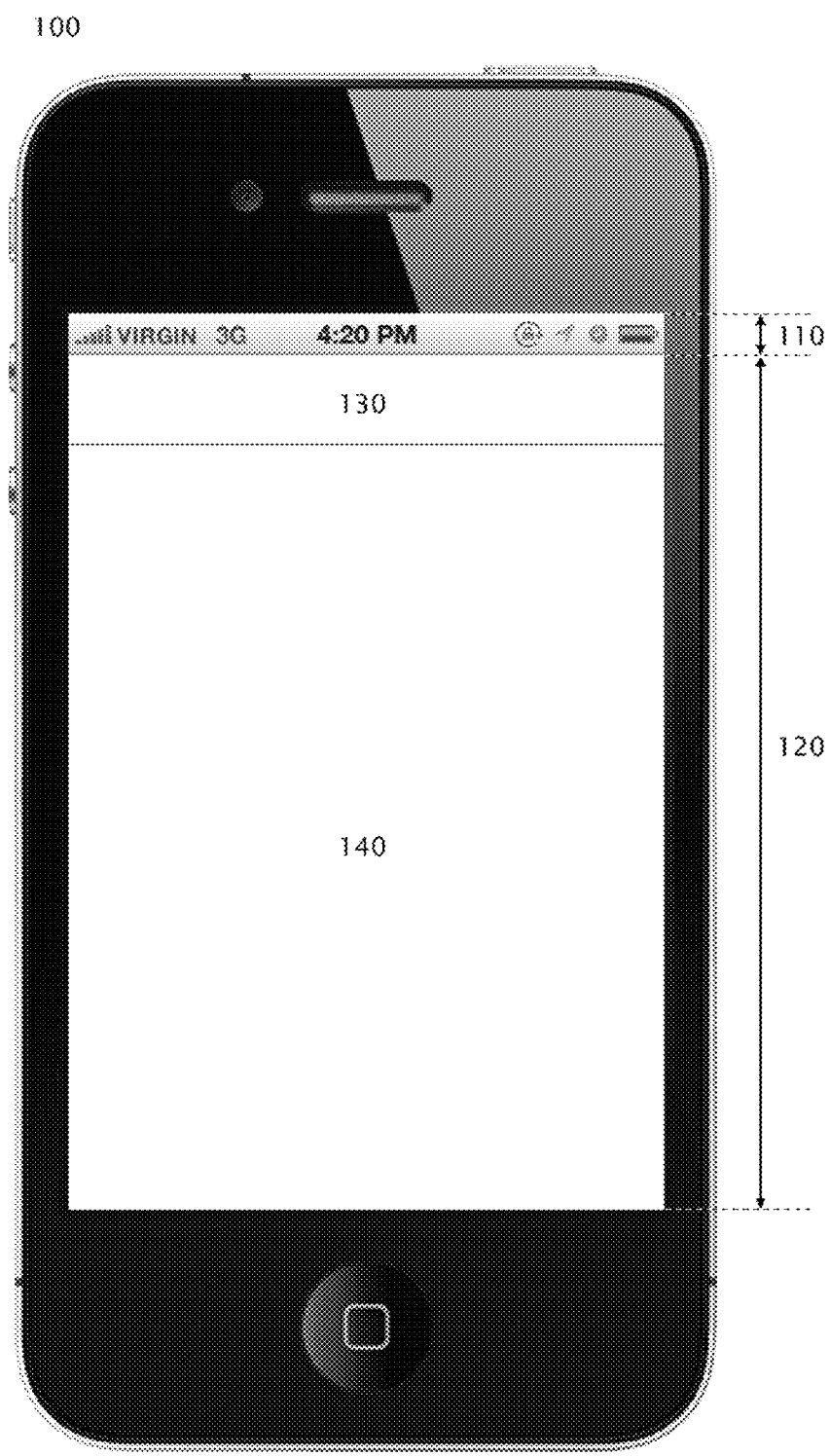
FIG. 1 illustrates an example of a commonly available mobile touch screen device.

FIG. 1 illustrates an example of the main components of a typical application on a popular mobile touch screen device. The touch screen of mobile device 100 consists of the device's header bar 110 and application area 120. Application area 120 is composed of application header 130 and application workspace 140.

Figure 2:
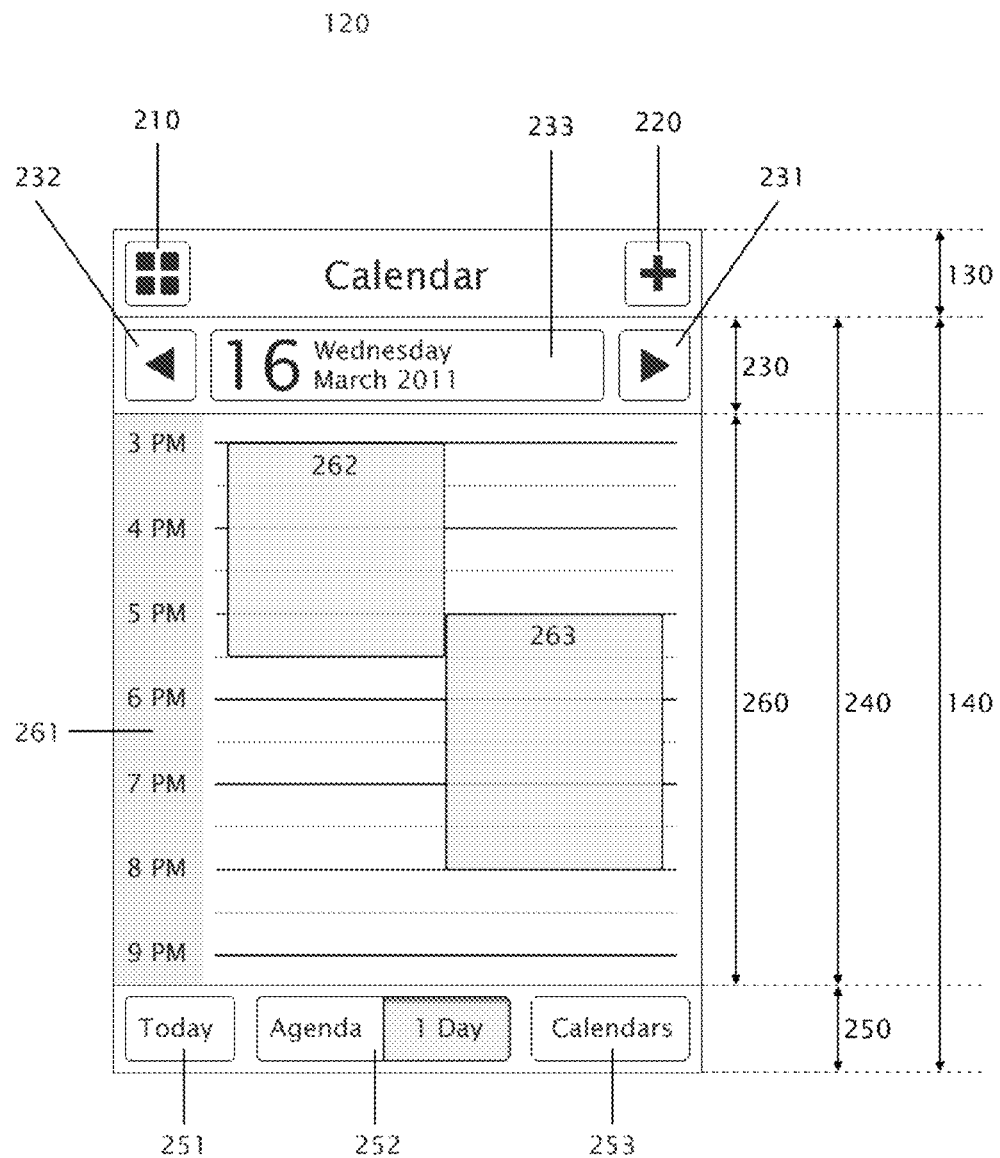
FIG. 2 illustrates an example of a 1-day view of a calendar application of a mobile touch screen device.

FIG. 2 illustrates the main components of a 1-day view on a calendar application of the aforementioned mobile touch screen device 100. Application header 130 contains a home button 210 that takes the user to the calendar application home screen. Button 220 is a Create Event button that allows the user to create a new event.

Application workspace 140 contains calendar view 240 and calendar footer 250. Calendar view 240 further contains a navigation header 230 and calendar grid 260. The navigation header 230 contains next date and previous date buttons 231 and 232, respectively. When the user taps on these buttons with a finger, calendar view 240 will advance one day forward or one day backward. Date button 233 summarizes the date that is loaded in the calendar grid and gives the user access to a date picker where the user can choose a specific date to load.

In one embodiment, tapping on date button 233 will cause a date selector to slide up from the bottom and cover application workspace 140. Tapping on a date on this date selector will cause the date selector to slide back out of view and expose calendar view 240 with the selected date loaded. In this embodiment, the date selector shows one month at a time. The user has the ability to navigate forward and backward a month at a time on the date selector to select any date in the past or future.

Calendar grid 260 in FIG. 2 shows the scheduled events of the user on a scrollable grid. This grid contains Time of Day column 261, which is a container that further contains text labels to identify the hour boundaries on the scrollable grid. These labels effectively identify the coordinates on the time-of-day axis of the calendar grid. Horizontal lines for the one hour and half-hour boundaries are placed on the grid. The half-hour boundaries are clearly identified by the horizontal lines without the need to clutter the time-of-day column with additional text labels Events 262 and 263 are illustrated to show examples of how events may appear on the calendar grid.

As illustrated in FIG. 2, not all of the hours of the day fit into calendar grid 260. In FIG. 2, only the hours between 3 PM and 9 PM are shown. A scrolling feature allows the user to drag into view any hours of the day. To scroll through the workspace, the user of the touch-screen device places a finger onto the calendar grid and drags it up or down. As the user drags their finger, the calendar grid will move the same vertical distance corresponding to the vertical movement of the finger. The view can be said to track the finger of the user at a 1:1 ratio meaning that if the user drags their finger up or down by 1 inch, the workspace will move in the same direction by 1 inch. The user can drag the grid down until 12 AM appears at the top of the calendar grid. They can drag the grid up until midnight appears at the bottom of the calendar grid.

Calendar footer 250 is shown at the bottom of application workspace 140. This footer contains Today button 251 which may be selected by the user to load calendar view 240 with the events for the current date. View selector 252 allows the user to select different calendar views such as Agenda and 1 Day view. In FIG. 2, 1 Day view is selected. In one embodiment, the Agenda view simply replaces calendar grid 260 with a list of events on the selected date. In this embodiment, the behavior of navigation header 230 is the same for both Agenda view and 1 Day view.

Figure 3:
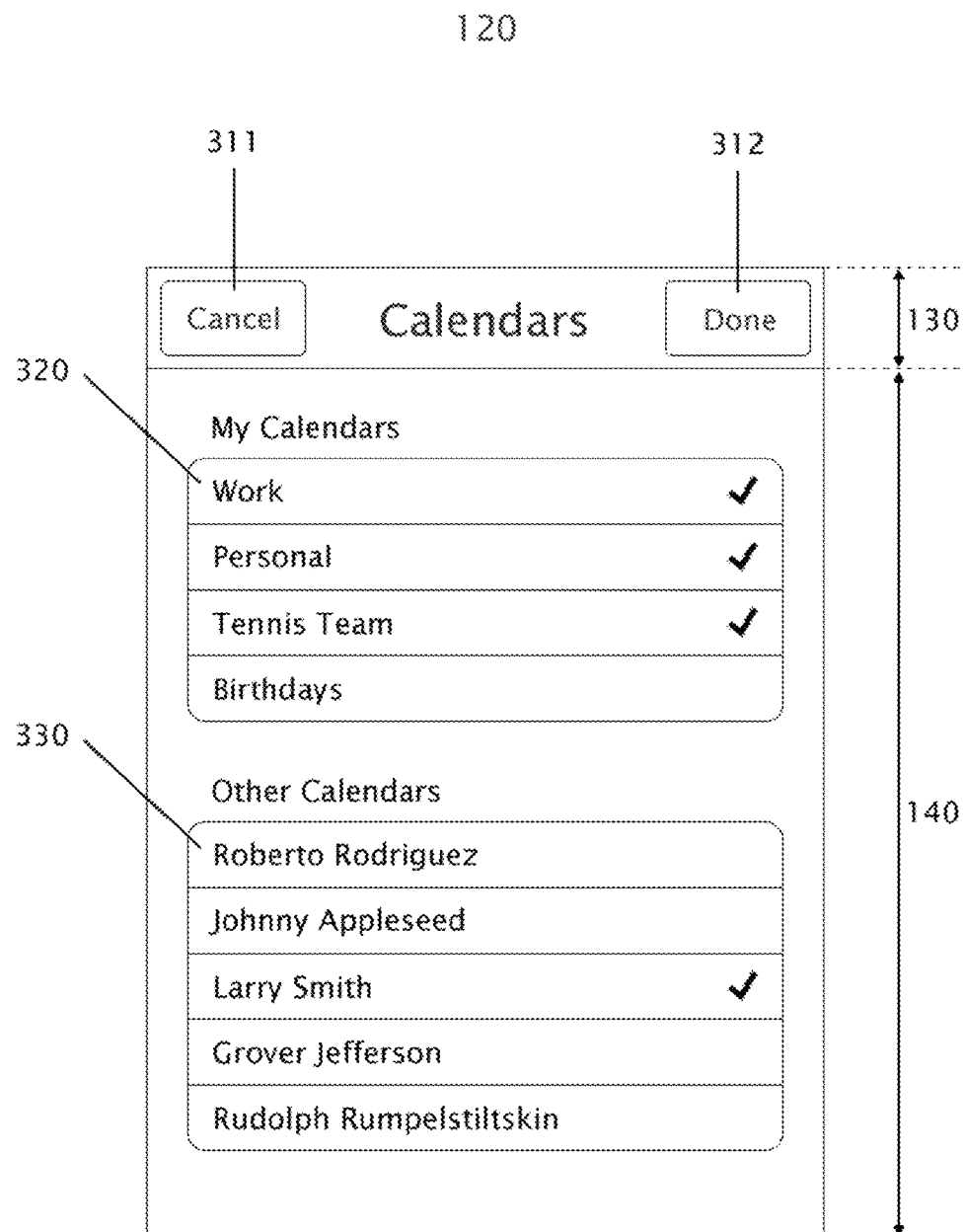
FIG. 3 illustrates a calendar selector where the user can choose which calendars to display on their calendar workspace.

It is common in related art calendar applications to allow users to organize events into separate calendars and to share their events and/or availability with others. For example, a user may maintain multiple calendars such as a work calendar and a personal calendar. Individuals may choose to share their calendar (e.g., availability or event details) with one or more other users. Calendars button 253 may give the user access to a list of these calendars where they can select a particular calendar to display on calendar view 240. When the user taps this button, application area 120 is loaded with the content of FIG. 3. FIG. 3 shows two sets of calendars. Calendar set 320 shows the calendars of the user while calendar set 330 shows the calendars for other individuals or users. The user may tap on a given calendar in either list to toggle it between the on and off states. A check mark on the right side of a calendar entry indicates that it is in the on state. The user may click on Cancel button 311 to cancel the changes or Done button 312 to apply the changes. Both the Cancel button 311 and Done button 312 will return the user back to the calendar grid. The ability to load the events or availability of another individual onto the workspace is particularly useful when trying to identify a common free or open time frame or slot for a group of potential event participants.

The description of FIG. 1 and FIG. 2 above describe the relevant parts of an exemplary embodiment of a calendar application for a touch screen device where the invention may be applied. With the details of the invention described herein, one skilled in the art will recognize that the invention may also be applied to other examples of calendar interfaces on a variety of devices. For example, although FIG. 2 represents a 1-day view of a calendar application, the invention may be applied to other n-day views. Also, other means for navigating between dates and changing views could be used. Additionally, it is not necessary for the device to support a touch screen. Other means for scrolling such as the use of a computer mouse as a scroll controller would be sufficient.

In the related art calendar applications on touch-screen devices, selecting the Create Event button 220 of FIG. 2 will typically open up a form where a user can enter event details such as the start and end time of an event without the benefit of viewing their calendar while entering this data. Unlike mouse-assisted computers, on related art applications of touch screen devices the user would not be able to drag on calendar grid 260 to create or reschedule events since dragging on this workspace is the method used to scroll other hours of the day into view.

In the disclosed invention, the user does not need to exit the calendar view to schedule a new event on calendar grid 260. Additionally, the user is allowed to schedule an event with any granularity of scheduled time directly on the calendar grid including one minute granularity. The user, for example, could create an event, such as an airline flight, that begins at 5:44 PM and ends at 8:15 PM directly on the calendar grid of a touch-screen device with their finger without having to exit the view.

Figure 4:
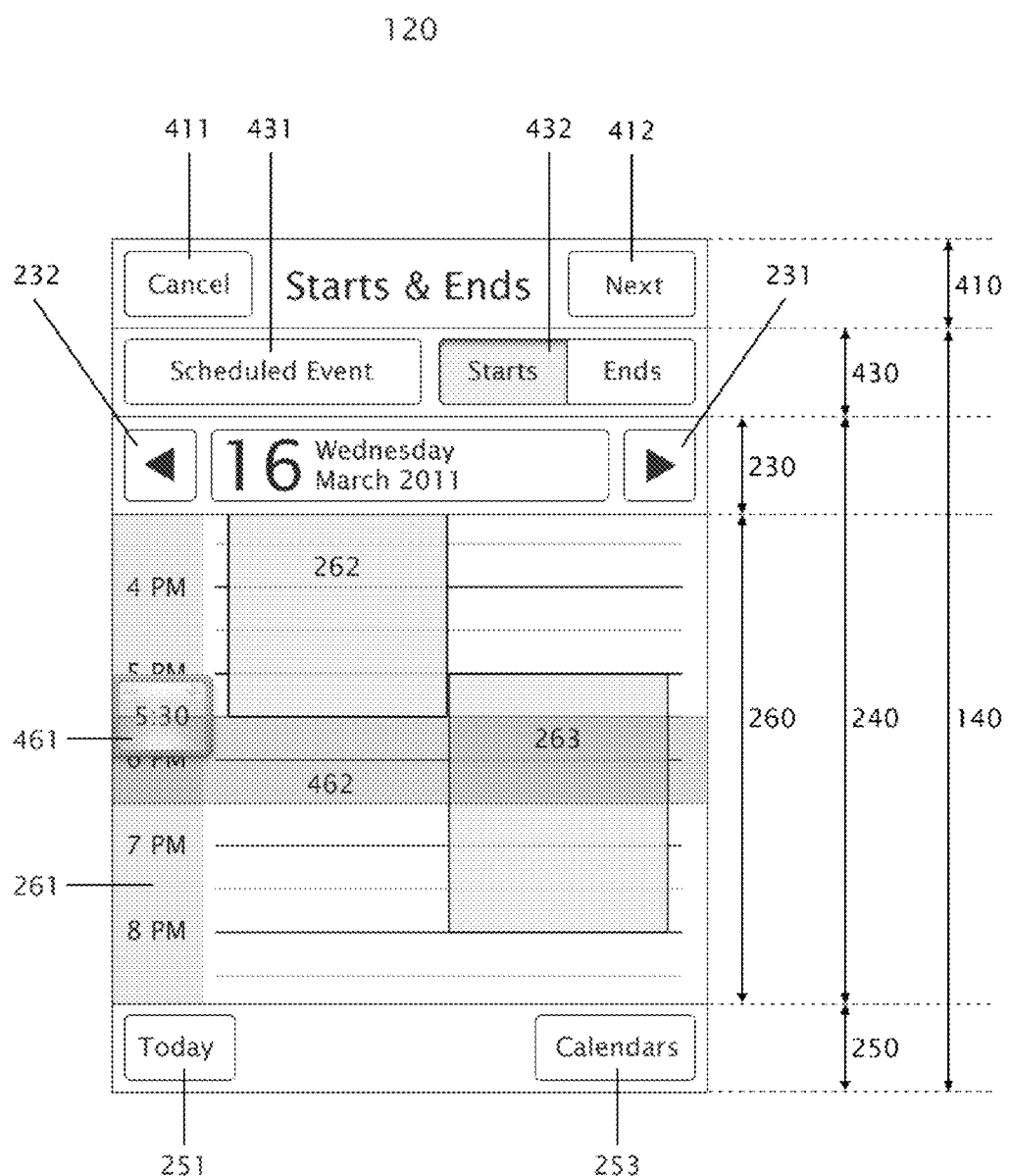
FIG. 4 shows the 1-day view when the user is scheduling the start time of an event.

In one embodiment of the present invention, selecting the Create Event button 220 of FIG. 2 would result in the application area that is illustrated in FIG. 4. The application header is loaded with editor header 410. The editor header 410 contains text that summarizes the properties that may be edited on the form. As shown in FIG. 4, the properties that may be edited are the start and end time of the event. The editor header 410 contains Cancel and Next buttons 411 and 412, respectively. Selecting the Cancel button 411 will cancel the Create Event action and return the user back to the state illustrated in FIG. 2. Next button 412 allows the user to proceed to other steps in the create event process after the user has completed scheduling the event on the grid. These other steps load application workspace 140 with other content that allows the user to enter additional data such as a title of the event, location, invitees, and alerts. A final step summarizes the event details, including its start and end times, and gives the user the opportunity to confirm the creation of the event or to discard the event.

Selecting the Create Event button 220 of FIG. 2 also causes Scheduler header 430 to be inserted between editor header 410 and navigation header 230. Navigation header 230 will slide down to make room for scheduler header 430. The space allocated to calendar grid 260 is consequently reduced. The scheduler header 430 contains event type selector 431 and starts/ends selector 432. Event type selector 431 allows the user to choose from a variety of event types. When selected, a menu would appear showing the user the types of events that are supported. In one embodiment of the present invention, this menu includes event types such as Scheduled Event and All-day Event. Starts/ends selector 432 allows the user to choose to edit the event start time or end time. The user taps on "Starts" or "Ends" to select the corresponding property for editing.

FIG. 4 illustrates calendar view 240 when the event type "Scheduled Event" is selected and the user has selected "Starts" from the starts/ends selector 432. Two items are added to calendar grid 260 to assist the user with scheduling the event. The first is scheduled time highlighter 462 which represents the event being created or edited. The top of the scheduled time highlighter 462 corresponds to the start time of the event being edited. The bottom of the scheduled time highlighter corresponds to its end time. Its height, therefore, reflects the event's duration. In one embodiment, the scheduled time highlighter 462 is a semitransparent layer that is placed over the events on the calendar grid. The semi-transparency allows the user to see if there are potential conflicting events with the highlighted scheduled time. In another embodiment, the height of the scheduled time highlighter 462 for new events defaults to one hour which corresponds to the default event duration.

The second item added to calendar grid 260 is view finder 461. View finder 461 is placed over the time-of-day column 261 and identifies the value of the property being edited—in this case, the start time.

While editing the start time of the event, both the view finder 461 and scheduled time highlighter 462 remain at fixed positions on calendar view 240. Instead of dragging the event, the user is allowed to drag calendar grid 260 up and down as they would do in the 1-day calendar view. However, in this case, dragging the grid up or down will affect the event's scheduled time. Dragging the grid down places earlier hours of the day into the scheduled time highlighter 462. Dragging it up places later hours of the day into the scheduled time highlighter 462. The height of the scheduled time highlighter 462 is not adjusted while the start time is being edited. Therefore, dragging the grid while editing the start time will not affect the event duration. Instead, the end time is adjusted by the same amount to maintain the fixed duration.

While in scheduling mode, the user can drag 12 am or midnight into the view finder so that these times may be set as the start time or, as will be described later, the end time. The area of the calendar grid above or below these times may remain blank. Alternatively, the hours and events of the adjacent dates could be shown.

In another embodiment, the view finder 461 is implemented as a virtual magnifying glass over time-of-day column 261. This magnifying glass allows the user to see more precise details of the time-of-day column corresponding to the start time of the event. Although the time-of-day column 261 of calendar grid 260 only displays labels for the hour boundaries, the virtual magnifying glass would show labels for additional time-of-day boundaries such as every half-hour. In another embodiment, the text size of the labels is not affected by the magnification level. Instead, the grid movement is amplified in the view finder 461. The magnification level therefore reflects the ratio of the movement in the magnifier to the movement on the grid. For example, with a magnification level of 2, the labels in the magnifier would move twice the vertical distance as the calendar grid while the user is dragging the grid up or down. This equates to the labels moving twice as fast.

A benefit of the magnification is that enough distance may be placed between labels in the view finder 461 so that only one can appear at a time. In an exemplary embodiment, the labels correspond to the supported granularity, or precision, of the scheduled time. The magnification effect allows the labels to be separated enough so that the user can simply drag the calendar grid until the label in the view finder 461 corresponds to the desired value. When they complete the drag operation, the calendar grid may self-align so that the time-of-day on the calendar grid that corresponds to the label in the view finder will snap to the fixed position of scheduled time highlighter 462. The result is that the time-of-day label corresponding to the scheduled time will automatically be centered in the view finder upon completing the drag operation.

Multiple magnification levels may be offered that give a user control over the desired precision of scheduled time. For example, magnification levels of 2, 12, and 60 may be offered to allow the user to configure the scheduled time with 30 minute, 5 minute, and 1 minute precision, respectively. The time-of-day labels in the view finder 461 correspond to each unit of scheduled time granularity or precision. Therefore, the magnification level can represent the number of labels that pass through the view finder 461 when the user drags the grid by one hour. For example, with a magnification level of 60, dragging the calendar grid by one hour will cause sixty labels, one for each minute of the hour, to pass through the view finder. To aid in the description that follows, the zoom precision of 30 minutes, 5 minutes, and 1 minute will sometimes be used rather than the magnification levels of 2, 12, and 60 respectively with 1 minute representing the highest zoom precision.

Figure 5:
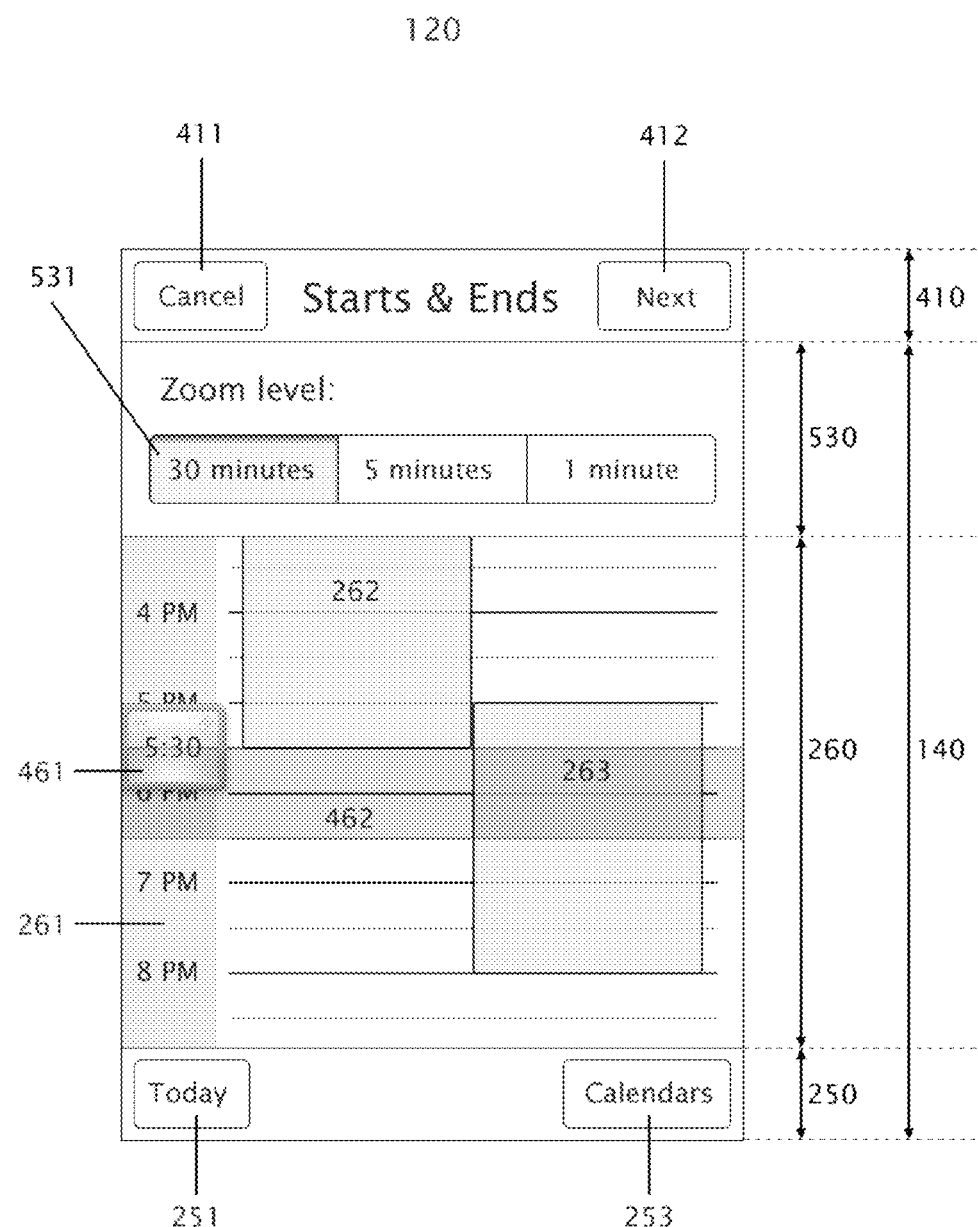
FIG. 5 shows a zoom panel above the calendar grid that the user can access to configure the scheduling granularity of the event.

The user can configure the zoom precision by tapping on the view finder 461. After doing so, zoom panel 530 of FIG. 5 appears above the calendar grid. In one embodiment, zoom panel 530 slides out from under application header 130 and covers the scheduler header 430 and navigation header 230 shown in FIG. 4. The zoom panel 530 is closed by tapping the view finder 461 again or tapping on one of the items of zoom precision selector 531. Tapping on one of these precisions will close zoom panel 530 and select the corresponding precision. When the zoom panel 530 is closed, it slides back under application header 130 to expose again the scheduler header 430 and navigation header 230.

One challenge with high magnification levels is the difficulty of precisely controlling the drag distance when attempting to place the desired time into the view finder. For instance, on a touch screen device, if the calendar grid moves the same distance that the user drags their finger, the slightest distance that the user can move their finger might be much greater than the zoom precision of the view finder. This is analogous to observing an object through a high power telescope where the slightest tap on the telescope can result in the object no longer being in view.

To resolve this, it is desired that the user have a fine level of control over the calendar grid drag distance for high zoom precisions. In one embodiment, the distance that the calendar grid moves as a result of the user dragging a scroll controller one unit of distance varies based on the zoom precision. On a touch screen, the scroll controller is the user's finger in contact with the touch screen. The distance that the grid moves relative to the distance that the user drags a scroll controller may be referred to as the distance to drag ratio. The distance to drag ratio may be 1:1, 1:6, and 1:30 for zoom precisions of 30 minutes, 5 minutes, and 1 minute respectively. For example, with a zoom precision of 1 minute on a touch screen device, dragging one's finger by 1 inch over the calendar grid will result in that grid scrolling by only one-thirtieth of an inch. This "micro-dragging" technique gives the user a fine level of control allowing them to schedule the event with a high-level of precision.

The result of the ratios in the preferred embodiment is that the same number of time-of-day labels pass through the view finder for a given drag distance regardless of the zoom precision. This also results in the labels passing through the view finder at a constant speed relative to the drag speed regardless of the zoom precision. This is helpful to the user since their concern is getting the proper label into the view finder. Having the labels move at the same speed relative to the scroll controller results in a consistent user experience across all zoom precisions.

The above description provides details on how the user might reschedule an event to different times of the day. To reschedule to different dates, the user simply uses the controls of the navigation header 230 as described above to load different dates into view. Scheduled time highlighter 462 and view finder 461 remain on the calendar view when the new date is loaded. Therefore, this results in a new scheduled date for the event.

To edit the end time or duration of an event the user selects or taps on the "Ends" item of the Starts/Ends selector 432. This results in the calendar view shown in FIG. 6. As shown, view finder 461 is aligned with the bottom of the schedule time highlighter when "Ends" is selected. In one embodiment, the view finder 461 for the end time is placed at a fixed location on the screen. When "Ends" is selected, calendar view 240 automatically loads the date containing the event's end time and automatically scrolls so that the end time on the grid is aligned with the bottom of the scheduled time highlighter and, hence, the view finder 461.

In another embodiment, the distance between the fixed locations of the view finder 461 for the start time state and end time state is equal to the default event duration. The result is that for events with default duration, the user can switch from editing the start time to editing the end time without the grid autoscrolling to align the end time with the scheduled time highlighter 462.

Like the scenario for editing the start time, the user will drag the grid to align the desired end time with the bottom of the scheduled time highlighter 462. The view finder behavior and magnification levels are the same as described for editing the start time. However, unlike editing the start time, when editing the end time only the bottom of the scheduled time highlighter 462 is placed at a fixed location. The start time remains constant and, therefore, the top of the scheduled time highlighter 462 will follow the start time of the event on the calendar grid as the user drags the calendar grid up or down. Visually, the scheduled time highlighter 462 will stretch or shrink as the user scrolls reflecting the change to the duration of the event.

When scheduling the end time, note that the top of the scheduled time highlighter 462 can scroll up until it is out of view. Selecting the "Starts" item of Starts/Ends selector 432 would automatically scroll the calendar grid to align the start time with the fixed position of the start time view finder of FIG. 4.

While editing the end time, consideration must be given to the scenarios where the user attempts to schedule the end time before the start time. There are two scenarios to consider. One is when the start time is on the same date as the end time, and the user drags the start time so that it is equal to or greater than the end time. For example, in FIG. 5, this can occur if the user dragged calendar grid 260 downwards until 5:30 PM on the grid is dragged into or below the view finder 461. In one embodiment, the system will resolve this case by enforcing a minimum duration equal to one unit of granularity of the grid. This is accomplished by evaluating the end time and start time upon the completion of a drag operation. If the start time equals or exceeds the end time, the calendar grid will auto-scroll up until the end time is one unit of granularity greater than the start time.

Another scenario that can cause the end time to be placed before the start time may occur when the user edits the end date for the event. To edit the end date, the user can simply navigate to other dates from navigation header 230. It is possible when selecting a new end date for the end time to fall before the start time. In one embodiment, the system will resolve this case by changing the start time of the event to equal one unit of grid granularity before the end time. When this occurs, the starts/ends selector will be reset back to the "Starts" state. Resetting to the "Starts" state prevents the user from inadvertently pushing the start time back while browsing backwards and forwards through their calendar while "Ends" is selected.

The detailed summary above describes how the user may schedule a new event on a calendar grid using the present invention. The same techniques described may be used to edit the scheduled time of an existing event. For example, when using a touch-screen device, tapping on an event on any calendar view could load the view with details about the event. This view would contain an edit button and a back button that takes the user back to the calendar view. Selecting the edit button would load the view with an edit screen that contains a set of properties that the user may edit including the scheduled time of the event. Selecting a property or group of related properties would take the user to a screen where they may edit those properties. One skilled in the art would recognize the use of these screens as a common method in related art applications for accessing and editing properties associated with objects such as events.

One difference between the prior art and the disclosed invention is the case where the user chooses to edit the scheduled time of the selected event. In one embodiment of the present invention, the screen for editing the property would be nearly identical to that of FIG. 4. The grid would be positioned so that the existing start time of the event is loaded into the view finder 461; the height of the scheduled time highlighter 462 would reflect the duration of the event; and the same method for editing the start and end time would be as discussed with respect to FIGS. 4, 5, and 6. One difference is that Next button 412 in the figures would instead be a Done button that returns the user back to the edit screen containing the set of properties that the user may edit. As in related art applications, this screen would provide Save and Cancel buttons to allow the user to save any edits and return back to the page containing the event details.

Figure 6:
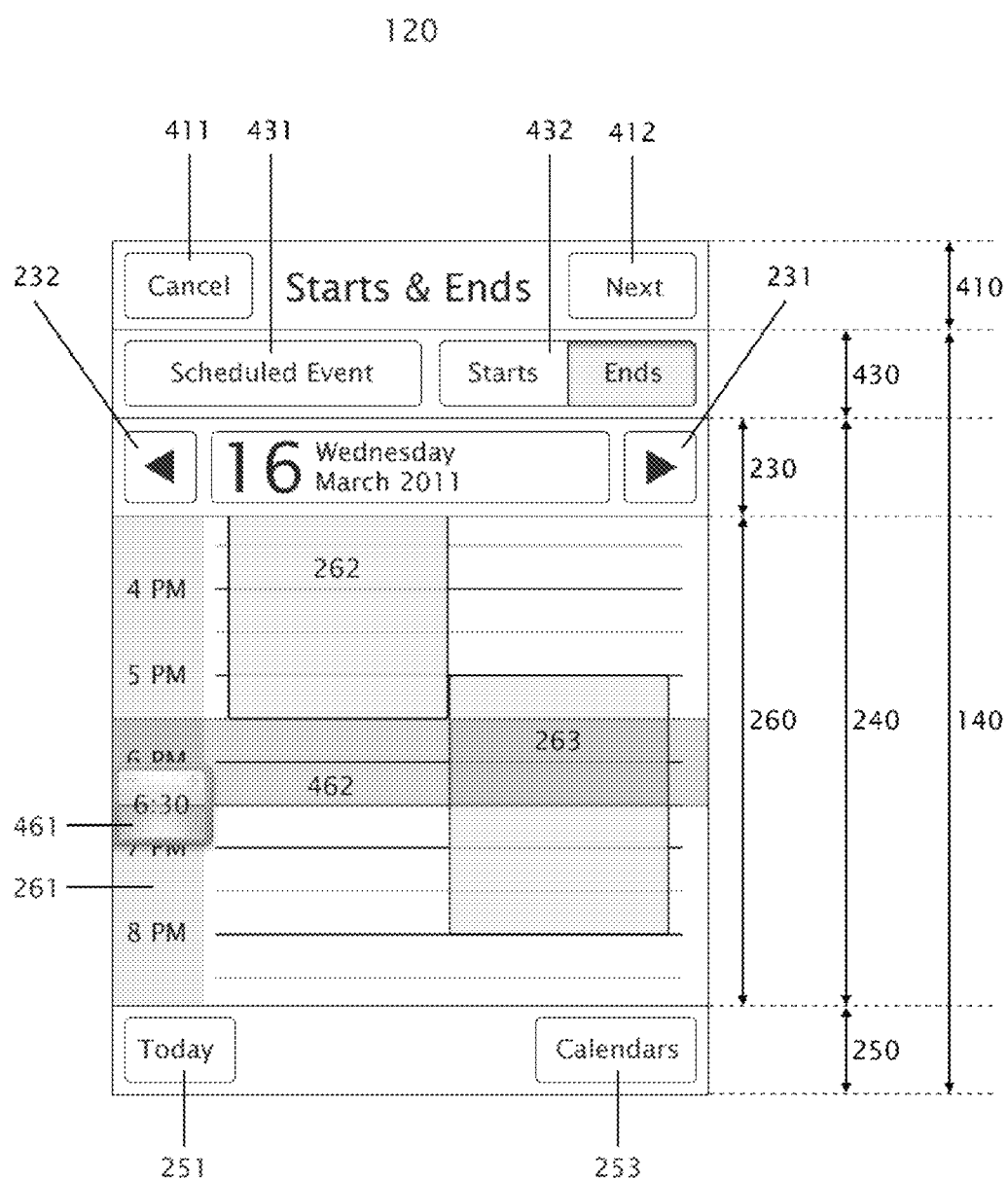
FIG. 6 shows the 1-day view when the user is scheduling the end time of an event.

Note that in FIG. 4 and FIG. 6 the view finder only appears for the property being edited. Before saving edits, it may be desirable for the user to review both the start and end time. In many cases, they can determine this by evaluating where the top or bottom border of the view finder 461 intersects the time-of-day column. However, for high zoom precisions, it may be difficult to determine the precise time without the aid of the view finder 461 since the labels of the time-of-day column have a much courser granularity. Also, for large duration events, the border of the scheduled time highlighter 462 for the property that is not being edited may be out of view.

One option that allows the user to review both the start and end time is to simply alternate tapping the Starts and Ends buttons of Starts/Ends selector 432 of FIG. 4 to toggle the view between FIG. 4 and FIG. 6. Also, as mentioned previously, Next button 412 of FIG. 4 takes the user to other steps of the event creation process where they can review the final settings before saving the edits.

Figure 7:
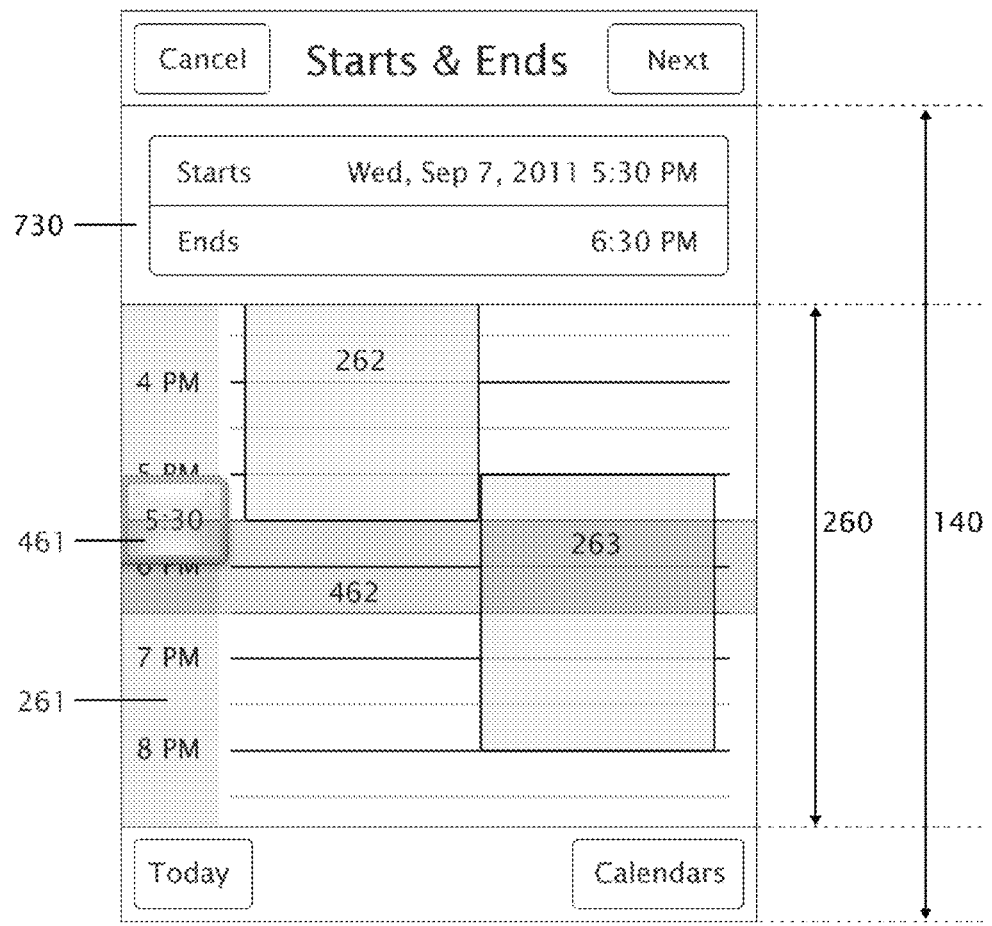
FIG. 7 shows an example of a tooltip above the calendar grid that displays the start and end time of the event being scheduled.

Another method for summarizing the start time and end time is to allow the user to access a tooltip that displays this information. In one embodiment, touching and holding a finger for a brief period of time on the scheduled time highlighter would result in a "tool-tip" sliding out from under application header 130. This is illustrated in FIG. 7 which shows starts/ends tooltip 730. The tooltip would slide back under the application header 130 when the user releases their finger from the screen of the device. In some embodiments, tooltip 730 could persist while the user is dragging the grid. For these embodiments, tooltip 730 could also serve as a view finder for the event data.

A similar tooltip could allow the user to access details about other events on the grid. For instance, touching and holding a finger on an event could cause a tooltip to slide out from under the application header 130 with data about the corresponding event such as its title and the calendar it is from. This can be particularly useful when calendars from multiple invitees are displayed on the calendar grid.

Typically, calendar applications also support an event type known as the "All Day" event. The scheduling information for these events only includes the start date and end date. By default, all day events share the same start and end dates. This is equivalent to a default duration of one day. However, multi-day durations are also permitted for all day events.

To configure an all day event, the user may tap on event type selector 431 of FIG. 4 or FIG. 6. After doing so, a menu appears showing the event types that are supported. This includes event types for scheduled events and all day events. Selecting "All Day Event" could cause the calendar workspace 140 to be replaced with the content shown in FIG. 8.

Figure 8:
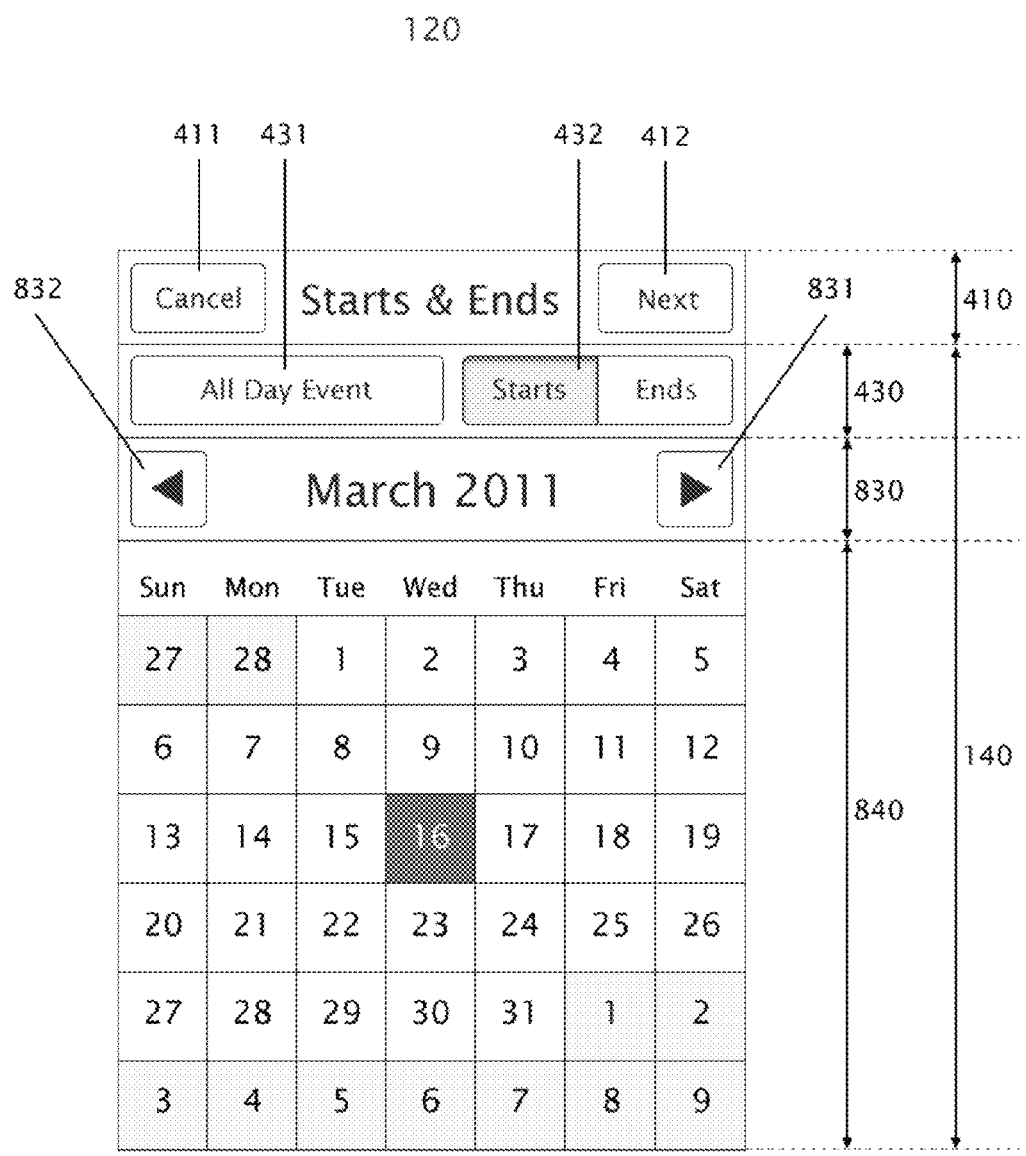
FIG. 8 shows a date selector that is used for picking the dates of an all-day event.

As shown, event type selector 431 identifies that this is an "All Day Event". A date selector appears below scheduler header 430 and consists of month navigator 830 and month grid 840. The scheduler header identifies the month being displayed. It also contains next month and previous month buttons 831 and 832, respectively. These buttons may be used by the user to navigate to other months. Month grid 840 highlights the date range for the all-day event. In the example of FIG. 8, the all day event is a single day event that occurs on March 16.

To choose another date, the user taps or drags on month grid 840. If "Starts" is selected in Starts/Ends selector 432 of FIG. 8, then tapping on a date of month grid 840 will set that date as the start date of the event. The end date will automatically be adjusted based on the duration of the event. If "Ends" is selected in Starts/Ends selector 432, then tapping on a date of month grid 840 will set that date as the end date of the event. If an end date is chosen that is less than the start date, then the start date will inherit the end date. Otherwise, the start date is not affected. In one embodiment, dragging a finger across a set of dates would highlight a contiguous range of dates bounded by the dates where the user initiated and completed the drag operation. The earliest of these dates would be the start date. The latest would be the end date.

Although a one day view is used above to describe embodiments of the invention, one skilled in the art would recognize that the invention could be extended to other calendar views. For instance, in an n-day view where n>1, the view finder and scheduled time highlighter 462 could occupy a selected column. Any means could be provided for selecting a column. For instance, tapping on the header of the column could select the corresponding column or date. As in the 1-day view, the usual methods for navigating an n-day view would also be supported. An alternative to tapping on a column to select a date would be to allow the user to drag the scheduled time highlighter 462 and the attached view finder 461 to other dates. The user could even drag these objects to other times or vertical positions on a calendar grid. Regardless of the method used to place these objects on a date, dragging the grid could be supported as a means to adjust the scheduled times as described for the 1-day view.

In an n-day view, it is not necessary for the view finder appear over the time-of-day column. In general, for all n-day views including 1-day view, the view finder 461 can be placed anywhere on the application workspace. Although it may be convenient to attach it to the scheduled time highlighter 462, the view finder 461 can also be separated from the scheduled time highlighter 462 and placed elsewhere on the display. For instance, in an n-day view, the scheduled time highlighter 462 may be on the column that is not adjacent to the time-of-day column. A particular application may choose to place the view finder 461 over the time-of-day column instead of attaching it to the event. Alternatively, a view finder 461 that resembles the starts/ends tooltip 730 of FIG. 7 could be placed anywhere on the screen. These and other alternative placements for the view finder 461 are all within the scope of the present invention. The view finder 461 may also be updated in a digital fashion much like a digital clock adjusts instantaneously each minute rather than scroll in an analog fashion.

Although the detailed summary of the disclosed invention describes how to use the invention to edit the start and end time of events in a calendar application, the present invention could be applied to applications other than a calendar application. The event is simply an object with start and end time properties. The event duration can also be thought of as a property of the event. The calendar grid is a workspace. The scheduled time highlighter 462 represents the object on the workspace. This object on the workspace contains top and bottom border features that relate directly to the start and end time properties of the event. The duration property relates to the distance between the start and end time features. These properties may be edited by locking the relevant aforementioned features of the object at a fixed location on a device's screen and dragging the workspace.

This same technique may be applied to other applications where it is desirable to edit properties of an object directly on a workspace. One example is a drawing application where objects are drawn on a two dimensional workspace. Using the present invention, the user of the drawing application could edit the location of an object on the workspace by fixing the position of the object and dragging the workspace in two dimensions until the desired location on the workspace is dragged under the object. This could also be applied to edit properties of the object other than its location. For instance, the user could stretch an object by locking only one side of the object on the screen while they drag the workspace.

Furthermore, the concept of a view finder may be applied to these other applications. For instance, in the drawing application, view finders could be placed on the x and y axis to show the current coordinates for the feature that is being dragged. In the case of the entire object being dragged, the feature could be the object's anchor point. The view finder could also have different zoom precisions. Micro-dragging could be used as an aid to the user for editing features on the workspace with high zoom precision levels.

The concept of view finders and micro dragging could also be used when dragging features of objects across a fixed workspace. While the feature is being dragged, view finders that show the coordinates of the feature could also follow that feature across the appropriate axis as the feature is being dragged. As previously described, these view finders could be implemented as scrollable containers. Rather than being fixed, the containers also move across the relevant axis as the feature is being dragged. The view finders could act as virtual magnifiers with multiple magnification levels. The magnification level of the view finder could also be a function of the zoom level of the workspace. Furthermore, the feature does not need to move the same distance that the scroll controller moves. Instead, micro-dragging could utilize the zoom precision to determine the distance that the feature moves relative to the distance that the scroll controller is moved.

One practicing the present invention on an application that utilizes a fixed workspace may choose to allow the user to drag the view finders to edit the corresponding features. They may also choose to show view finders for multiple editable properties simultaneously rather than only showing view finders for the properties or features being edited. These and other variants are all within the scope of the present invention.

Figure 9:
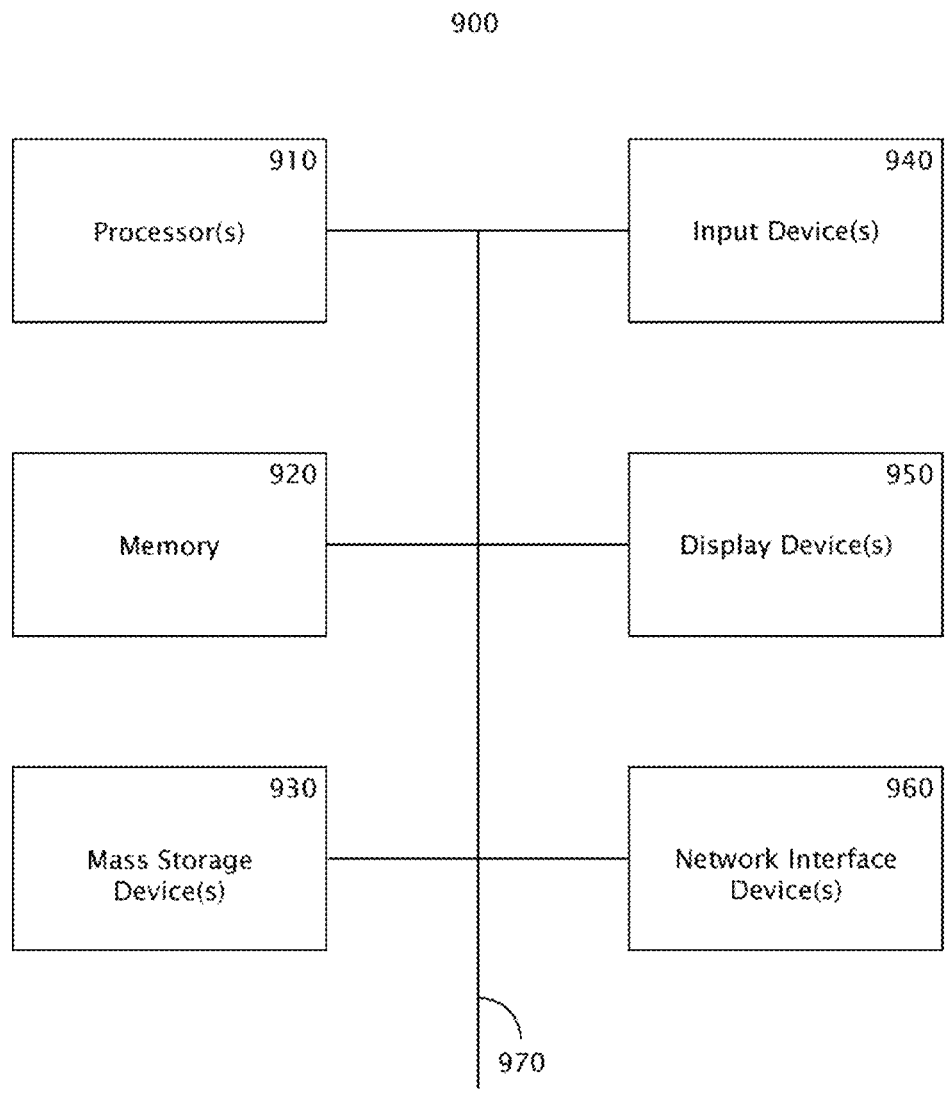
FIG. 9 illustrates an exemplary computing system 900 that may be used to implement an embodiment of the present invention

FIG. 9 illustrates an exemplary computing system 900 that may be used to implement an embodiment of the present invention. The computing system 900 of FIG. 9 includes one or more processors 910 and memory 920. Main memory 920 stores, in part, instructions and data for execution by processor 910. Main memory 920 can store the executable code when in operation along with the data used by the code. The system 900 of FIG. 9 further includes a mass storage device(s) 930, user input device(s) 940, display device(s) 950, and network interface device(s) 960.

The components shown in FIG. 9 are depicted as being connected via data interconnect 970. Although shown as a single bus, the components may be connected through one or more data transport means. For example, processor unit 910 and main memory 920 may be connected via a local microprocessor bus. The mass storage device(s) 930, user input device(s) 940, display device(s) 950, and network interface device(s) 960 may be connected via one or more input/output (I/O) buses. Additionally, one or more devices may be implemented within a single integrated circuit with its own local data transport for communicating between the devices within the integrated circuit.

Mass storage device(s) 930, such as flash memory, a magnetic disk drive, or optical disk drive, is a non-volatile storage device for storing data and instructions for use by processor unit 910. Mass storage device 930 can store the system software for implementing embodiments of the present invention for purposes of loading that software into main memory 920.

Input device(s) 940 provide a portion of a user interface. Input devices 940 may include a touch screen, an alphanumeric keypad, such as a keyboard, or a pointing device, such as a mouse, a trackball, stylus, or cursor direction keys. A global positioning system (GPS) device may also be used as an input device.

Display device(s) 950 may include a liquid crystal display (LCD) or other suitable display device. Display system 950 receives textual and graphical information, and processes the information for output to the display device.

Network interface device(s) 960 may support both wireless and wired interfaces, such as Bluetooth, wifi, cellular, and Ethernet.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. It may include some, all, or additional devices show in FIG. 9. The computer system can also include different bus configurations, networked platforms, multi-processor platforms, etc. Various operating systems can be used including iOS, Android, Unix, Linux, Windows, Macintosh OS, and other suitable operating systems.

One skilled in the art could practice the disclosed invention on a computing system using standard computer programming techniques. For instance, both the calendar grid and view finder are just containers with scroll capability. The illusion of a view finder with a magnification glass capability can be constructed by placing a semi-transparent image over the view finder container such as a Portable Network Graphics (PNG) image. The distance that the user moves a scroll controller of an input device may be utilized to determine the distance that the content of the scrollable containers should move. For example, on a touch screen device, the distance that the user drags a finger on the screen of the device may be used to calculate the distance that the content of the calendar grid and the view finder should move. Separate formulas may be used to determine the distance to scroll the content of these containers. These formulas can take into account the zoom precision to implement the micro-dragging effect described previously. Furthermore, the selected zoom precision may be used to determine what set of labels to load into the view finder container.

What is claimed is:

1. A method for editing a start time property of an event in a digital calendaring environment, the method comprising:
   executing a plurality of instructions stored in a memory of a computing device hosting the digital calendaring environment, wherein the execution of the instructions creates a calendar grid in the digital calendaring environment, the calendar grid including a time-of-day axis;
   receiving a first set of coordinates identifying a placement of the event in the calendar grid, wherein the event includes an editable start time property, the editable start time property defined by a value that is determined by the placement of a duration feature of the event in the calendar grid; and
   executing a plurality of instructions stored in the memory of the computing device, wherein the execution of the instructions by the processor of the computing device:
       generates a view finder disposed in a fixed position over a region of the time-of-day axis,
       locks the placement of the duration feature of the event at a fixed position on a screen of a computing device displaying the digital calendaring environment,
       receives a second set of coordinates identifying a movement of the calendar grid relative to the fixed duration feature and fixed view finder, wherein the movement of the calendar grid correlates to a dragging gesture performed by a user on a user interface of the computing device displaying the digital calendaring environment,
       identifies, by way of the view finder, the value of the start time property being edited as a consequence of the movement of the calendar grid, wherein identifying the value includes displaying a time-of-day label disposed on the time-of-day axis when the time-of-day label passes beneath the fixed view finder as the time-of-day axis moves in response to the dragging gesture, and
       updates the value of the start time property of the event to match a time-of-day identified by the time-of-day label displayed beneath the view finder when the dragging gesture is complete.

2. The method of claim 1, wherein the time-of-day label identifies one or more coordinates on an axis of the calendar grid.

3. The method of claim 1, wherein the view finder is operational to offer a virtual magnifier functionality.

4. The method of claim 3, wherein the time-of-day label identifies one or more coordinates on an axis of the calendar grid.

5. The method of claim 3, wherein the view finder supports a plurality of magnification levels as a part of the virtual magnifier functionality.

6. The method of claim 1, wherein one or more edits to the start time property are performed by moving the calendar grid a fraction of an overall distance that the set of coordinates corresponding to movement of the calendar grid otherwise reflect.

7. The method of claim 6, wherein the view finder is operational to offer a virtual magnifier functionality, wherein the view finder supports a plurality of magnification levels as part of the virtual magnifier functionality, and wherein the fraction of the overall distance is a function of a selected magnification level of the plurality of magnification levels of the virtual magnifier.

8. The method of claim 7, further comprising placing the view finder over a container of labels that identify coordinates on an axis of the calendar grid.

9. The method of claim 7, wherein the set of coordinates are generated as a byproduct of a finger of a user being dragged across a touch screen device.

10. The method of claim 9, wherein the time-of-day label identifies one or more coordinates on an axis of the calendar grid.

11. The method of claim 1, wherein the editable start time property corresponds to an end time property of the event.

12. The method of claim 11, wherein a view finder is used to identify a time-of-day for the start time property being edited as a consequence of the movement of the calendar grid.

13. The method of claim 12, wherein the time-of-day label identifies one or more coordinates on an axis of the calendar grid.

14. The method of claim 12, wherein the view finder is operational to offer a virtual magnifier functionality.

15. The method of claim 14, wherein the time-of-day label identifies one or more coordinates on an axis of the calendar grid.

16. The method of claim 14, wherein the view finder supports a plurality of magnification levels as part of the virtual magnifier functionality.

17. The method of claim 16, wherein one or more fine edits to the start time property are facilitated by moving the calendar grid a fraction of an overall distance that the coordinates corresponding to movement of the calendar grid otherwise reflect.

18. The method of claim 17, wherein the fraction of the overall distance is a function of a selected magnification level of the plurality of magnification levels of the virtual magnifier.

19. The method of claim 18, further comprising placing the view finder over a time-of-day container.

20. The method of claim 18, wherein the set of coordinates are generated as a byproduct of a finger of a user being dragged across a touch screen device.

21. The method of claim 20, wherein the time-of-day label identifies one or more coordinates on an axis of the calendar grid.

22. A method for editing an end time property of an event in a digital calendaring environment, the method comprising:
   executing a plurality of instructions stored in a memory of a computing device hosting the digital calendaring environment, wherein the execution of the instructions creates a calendar grid in the digital calendaring environment, the calendar grid including a time-of-day axis;
   receiving a first set of coordinates identifying a placement of the event in the calendar grid, wherein the event includes an editable start time property and an editable end time property, the editable end time property defined by a value that is determined by the placement of a duration feature of the event in the calendar grid; and
   receiving a second set of coordinates identifying a movement of the calendar grid relative to the duration feature to change the value of the end time property, wherein the movement correlates to a dragging gesture; and
   executing a plurality of instructions stored in the memory by way of the processor, wherein the execution of the instructions:
      generates a view finder disposed in a fixed position over a region of the time-of-day axis,
      locks the placement of an edge of the duration feature of the event at a fixed position on a screen of a computing device displaying the digital calendaring environment,
      identifies, by way of the view finder, the value of the end time property being edited as a consequence of the movement of the calendar grid, wherein identifying the value includes displaying a time-of-day label disposed on the time-of-day axis when the time-of-day label passes beneath the fixed view finder as the time-of-day axis moves in response to the dragging gesture, and
      updates the value of the end time property to match a time-of-day identified by the time-of-day label visible beneath the view finder when the dragging gesture is complete.

23. The method of claim 22, wherein the time-of-day label identifies one or more coordinates on an axis of the calendar grid.

24. The method of claim 22, wherein the view finder is operational to offer a magnification functionality and supports a plurality of magnification levels as a part of the magnification functionality.

25. The method of claim 24, wherein each magnification level of the plurality of magnification levels of the view finder is a function of a zoom level of the calendar grid.

26. The method of claim 24, wherein one or more edits to the end time property are performed by moving the duration feature of the event a fraction of an overall distance that the set of coordinates corresponding to the movement of the calendar grid otherwise reflect.

27. The method of claim 26, wherein the fraction of the overall distance is a function of the magnification level of the magnification functionality.

28. The method of claim 27, wherein the set of coordinates are generated as a byproduct of a finger of a user being dragged across a touch screen device.

29. The method of claim 28, wherein the time-of-day label identifies one or more coordinates on an axis of the calendar grid.

* * * * *